United States Patent
Liu et al.

(10) Patent No.: US 10,805,206 B1
(45) Date of Patent: Oct. 13, 2020

(54) METHOD FOR REROUTING TRAFFIC IN SOFTWARE DEFINED NETWORKING NETWORK AND SWITCH THEREOF

(71) Applicants: CyberTAN Technology, Inc., Hsinchu (TW); National Chung Cheng University, Chiayi, Taiwan (TW)

(72) Inventors: Poyu Liu, Hsinchu (TW); Wei-Ning Chang, Hsinchu (TW); Chung-Ho Wu, Hsinchu (TW); Shi-Wei Lee, Chiayi (TW); Ting-Shan Wong, Chiayi (TW)

(73) Assignees: CyberTAN Technology, Inc., Hsinchu (TW); National Chung Cheng University, Chiayi, Taiwan (TW)

( * ) Notice: Subject to any disclaimer, the term of this patent is extended or adjusted under 35 U.S.C. 154(b) by 0 days.

(21) Appl. No.: 16/420,468

(22) Filed: May 23, 2019

(51) Int. Cl.
  *H04L 12/727* (2013.01)
  *H04L 12/721* (2013.01)

(52) U.S. Cl.
  CPC .......... *H04L 45/121* (2013.01); *H04L 45/124* (2013.01)

(58) Field of Classification Search
  None
  See application file for complete search history.

(56) References Cited

U.S. PATENT DOCUMENTS

| | | | | |
|---|---|---|---|---|
| 10,057,149 B2* | 8/2018 | Takemoto | .......... | H04Q 11/0066 |
| 10,419,332 B2* | 9/2019 | Ouedraogo | .......... | H04L 65/608 |
| 2011/0063979 A1* | 3/2011 | Matthews | .......... | H04L 45/745 370/237 |
| 2013/0242758 A1* | 9/2013 | Vaidya | .......... | H04L 43/10 370/248 |
| 2013/0329584 A1* | 12/2013 | Ghose | .......... | H04L 45/586 370/252 |
| 2014/0317273 A1* | 10/2014 | Kruglick | .......... | H04L 43/04 709/224 |
| 2015/0003230 A1* | 1/2015 | Mitsumori | .......... | H04L 45/22 370/218 |
| 2015/0244617 A1* | 8/2015 | Nakil | .......... | H04L 41/0631 709/224 |
| 2015/0334009 A1* | 11/2015 | Clark | .......... | H04L 43/045 370/252 |
| 2016/0285750 A1* | 9/2016 | Saquib | .......... | H04L 43/10 |
| 2018/0062990 A1* | 3/2018 | Kumar | .......... | H04L 45/70 |
| 2018/0205660 A1* | 7/2018 | Shi | .......... | H04L 43/0864 |

(Continued)

FOREIGN PATENT DOCUMENTS

| CN | 103795596 A | 5/2014 |
|---|---|---|
| CN | 106559334 A | 4/2017 |

*Primary Examiner* — Sithu Ko
*Assistant Examiner* — Emmanuel K Maglo
(74) *Attorney, Agent, or Firm* — ScienBiziP, P.C.

(57) ABSTRACT

A method for rerouting traffic by a switch in a software defined networking (SDN) arrangement comprises an additional switch, multiple routing paths between the original switch and the additional switch being preconfigured by a SDN controller. The original switch collects network statistics by transmitting monitoring packets on each of the multiple routing paths and then calculating a round-trip time (RTT) value for each path on the return of the monitoring packets to the additional switch, the two switches functioning together as local controllers. After collection of network statistics from all the multiple routing paths, the original switch selects the routing path with the smallest RTT value and reroutes traffic accordingly.

10 Claims, 3 Drawing Sheets

(56) References Cited

U.S. PATENT DOCUMENTS

2018/0359027 A1* 12/2018 Brzozowski ....... H04B 10/0775
2019/0297011 A1*  9/2019 Nainar ................... H04L 45/70
2019/0386913 A1* 12/2019 Wei ..................... H04L 49/1515
2020/0007427 A1*  1/2020 Kumar T V ........ H04L 43/0829
2020/0028624 A1*  1/2020 Fouli .................... H04L 1/0045

* cited by examiner

METHOD FOR REROUTING TRAFFIC IN SOFTWARE DEFINED NETWORKING NETWORK AND SWITCH THEREOF

FIELD

The subject matter herein generally relates to software defined networking networks.

BACKGROUND

A network throughput depends on congestion of the routing path. Traditional network routing algorithm selects the shortest routing path. The routing path of the traffic transmission does not change with network congestion. Therefore, the network throughput will be reduced when congestion occurs.

Software defined networking (SDN) adopts management by centralized controllers. The SDN controller periodically probes switches in the network to obtain the traffic situation of the entire network, and re-routes to achieve load balancing and improve the network throughput.

However, the SDN controller must probe a large number of links at high frequencies, and process a large number of probe packets. The more probe packets the SDN controller transmits, the higher is the processing burden on the controller, which makes the SDN controller become the bottleneck under heavier traffic rate, and additional end-to-end latency is introduced.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
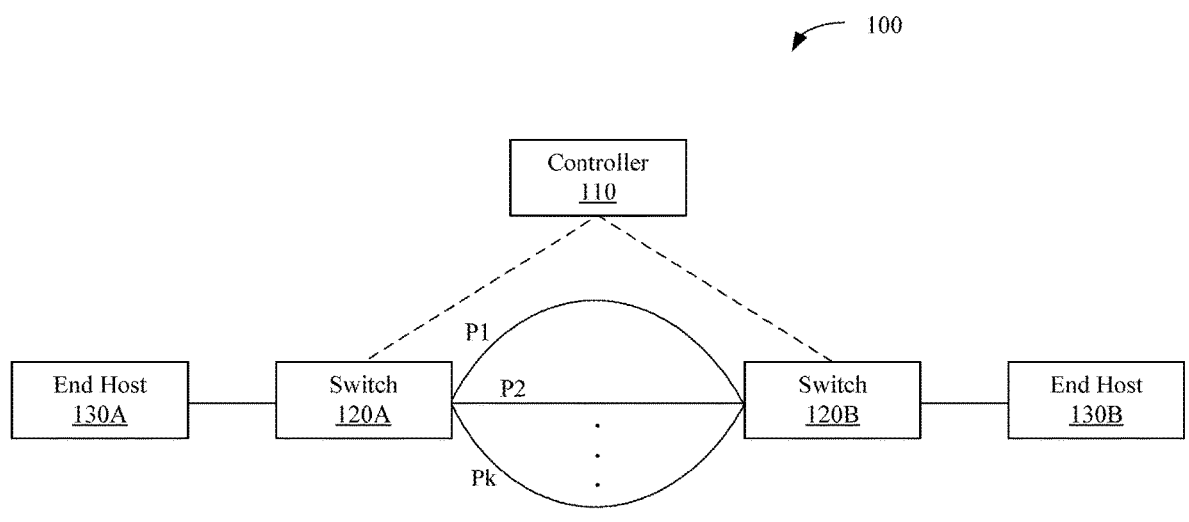
FIG. 1 is a block diagram of one embodiment of a working environment of a software defined networking (SDN) arrangement.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 3:
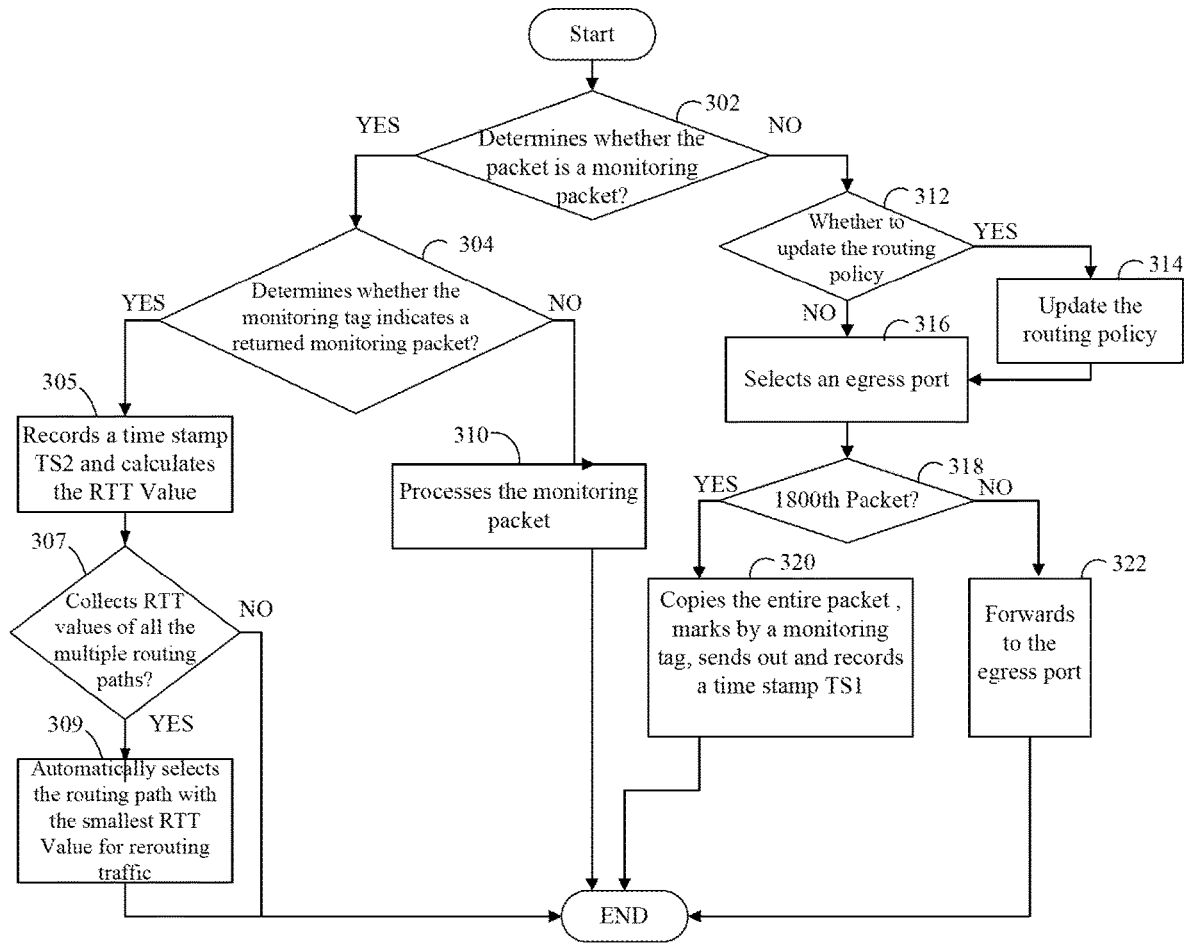
FIG. 3 is a flow chart of one embodiment of a method for rerouting traffic applied to the switch of FIG. 2.

FIG. 1 illustrates an environment of a software defined networking (SDN) network 100 according to an embodiment. The SDN network 100 comprises a controller 110, a switch 120A, a switch 120B, an end host 130A, and an end host 130B. The controller 110 is located at a control layer of the SDN network 100, and is a logical control center of the SDN network 100. The controller 110 is connected to the switch 120A and the switch 120B, provides network instructions to the switch 120A and the switch 120B, and manages a network topology between the switch 120A and the switch 120B. The end host 130A and the end host 130B are connected to each other by the SDN network 100. As shown in FIG. 3, the end host 130A is connected to the switch 120A, and the end host 130B is connected to the switch 120B. All routing paths between the switch 120A and the switch 120B, i.e., the P1, P2, . . . Pk routing paths shown in FIG. 1, can be configured by the controller 110 in advance. As illustrated in FIG. 1, the switch 120A is an upstream switch of the switch 120B.

In this embodiment, the switch 120A is configured to collect network statistics directly from data plane while the packets are being processed to reduce processing load at the controller 110. The switch 120A periodically transmits packets for monitoring purposes (monitoring packets) on the preconfigured multiple routing paths, i.e., the k routing paths in FIG. 1, to determine the current network statistics and detect congestion. The switch 120A collects the network statistics from all the multiple routing paths based on the packets. In one embodiment, the network statistics provide round-trip time (RTT) metrics. By obtaining the network statistics, the switch 120A is able to reroute traffic without reference to or burdening the controller 110.

Figure 2:
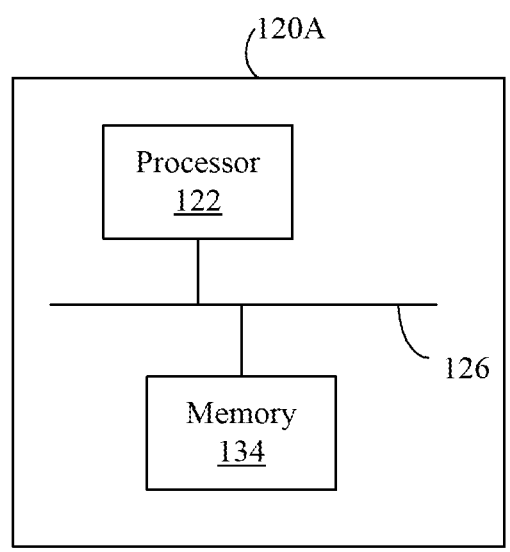
FIG. 2 is a block diagram of one embodiment of a switch of the SDN network of FIG. 1.

FIG. 2 illustrates a block diagram of the switch 120A according to an embodiment. The switch 120A comprises a processor 122, and a memory 124. The processor 122, and the memory 124 communicate through a bus 126. The processor 122 may be a general-purpose central processing unit, a microcontroller, an application-specific integrated circuit (ASIC), or one or more integrated circuits, to execute a related program. The memory 124 may be read-only memory (ROM), a static storage device, a dynamic storage device, or a random access memory (RAM). The memory 124 may store one or more computer programs for operating the switch 120A, the programs being executed by the processor 122.

FIG. 3 illustrates a flowchart of a method for rerouting traffic, executed by the switch 120A, according to an embodiment. In this embodiment, the switch 120A is a source switch on multiple routing paths, and transmits monitoring packets on all the multiple routing paths to the switch 120B, which will return the monitoring packets to the switch 120A.

At block 302, the switch 120A receives a packet and determines whether the packet is a monitoring packet. The received packet is examined for being marked for monitoring purposes or an unmarked packet. In one embodiment, a packet is marked by use of a monitoring tag in a specific field of the packet. For example, the following non-limiting list shows possible fields that may be used for marking with a tag: metadata in a service header, other fields in the IP header, any other available fields in the packet header, etc. If the packet has been determined as a monitoring packet, the packet is forwarded for processing as a monitoring packet, as depicted by block 304; otherwise, the packet is forwarded for processing as a normal packet, as depicted by block 310.

At block 304, the switch 120A determines whether the monitoring tag contained in a determined monitoring packet indicates that it is a returned monitoring packet. In one embodiment, the monitoring tag comprises switch information, routing path information, and category information. The switch information comprises a source switch identification of the monitoring packet, for example, MAC address of the switch which has transmitted the monitoring packet. The routing path information comprises a routing path identification, for example, P1, P2 . . . Pk, as denoted in FIG. 1. The category information comprises a flag bit to indicate whether the packet is outgoing or is a returned monitoring packet. For example, the flag value of "1" indicates the packet is the outgoing monitoring packet, and the flag value of "0" indicates the packet is the returned or incoming monitoring packet. In this embodiment, the category information of the monitoring tag of the packet may indicate it is the returned monitoring packet. If the received packet is a returned monitoring packet, the method goes to block 305, to undergo processing as a returned monitoring packet, otherwise, the method goes to block 310 for processing as a monitoring packet.

At block 305, the switch 120A records a time stamp TS2 to time stamp the received returned monitoring packet. The switch 120A collects network statistics from the returned monitoring packet. In one embodiment, the switch 120A retrieves a time stamp TS1 recorded for the issue of the monitoring packet based on the monitoring tag of the returned monitoring packet. The switch 120A then calculates the RTT value as the difference between the time stamps TS2 and TS1 values for the routing path traced by the returned monitoring packet. After obtaining the RTT value, the switch 120A records the RTT value for the routing path and discards the returned monitoring packet.

At block 307, the switch 120A determines whether RTT values of all the multiple routing paths have been collected. If the switch 120A has collected RTT values of all the multiple routing paths, the method goes to block 309 to routing path selection.

At block 309, the switch 120A automatically selects out of many routing paths the routing path with the smallest RTT value, for rerouting traffic.

At block 310, the switch 120A receives the monitoring packet from its upstream switch. The switch 120A copies the entire monitoring packet after receiving it. The copied monitoring packet is forwarded to an egress port after removing the monitoring tag. In this way, monitoring packets are transparent to all end hosts in the SDN network 100, e.g., the end host 130A and the end host 130B in FIG. 1. For the original monitoring packet, the switch 120A modifies the monitoring tag and returns the monitoring packet to its upstream switch.

At block 312, the switch 120A receives a normal packet and starts to process it. If the switch 120A has selected a new routing path, the switch 120A further determines whether to update a routing policy. In one embodiment, the switch 120A stores forwarding rules and the routing policy, these being configured by the controller 110 after the SDN network 100 initialization. In one embodiment, in order to update the routing policy under dynamic traffic, the switch 120A determines whether to update the routing policy based on a time difference value between two sequential packets entering the switch 120A. If the time difference value is greater than or equal to a predetermined value, the method goes to block 314, otherwise, the method goes to block 316.

At block 314, the switch 120A updates the routing policy and consequently reroutes future traffic.

At block 316, the routing policy remains unchanged. The switch 120A selects a packet issuing port based on the forwarding rules and the routing policy.

At block 318, the switch 120A further determines whether the received packet is the $1800^{th}$ packet, numbered from the last time that the routing policy was configured or updated. If the received packet is the $1800^{th}$ packet or later, the method goes to the block 320, otherwise the method goes to block 322.

At block 320, the switch 120A copies the received packet, and inserts the monitoring tag into the copied packet to generate a monitoring packet. The switch 120A transmits the monitoring packet on each of the multiple routing paths to a sink switch, e.g., the switch 120B in FIG. 1. The switch 120A further records the time stamp TS1 before transmission begins.

At block 322, the switch 120A forwards the received packet to the selected port of issue.

In another embodiment, a monitoring interval is configured into the switch 120A to periodically transmit monitoring packets, to collect network statistics and detect network congestion. In that embodiment, the monitoring interval is selected and input by an administrator of the switch 120A or an administrator of the SDN network 100.

The present disclosure enables the switches in the SDN network 100 to monitor network statistics and rerouting by reference to the data plane only. Without intervention by a central SDN controller, in calculating and configuring a better route, delay in detecting network congestion is reduced. After detection, the reaction time for updating the routing is minimized as the switches function as local controllers. Therefore, no new forwarding rules and routing policy need to be updated and the load of the SDN controller is reduced.

The embodiments shown and described above are only examples. Many details are often found in the art such as the other features of a switch. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for rerouting traffic in a software defined networking (SDN) network applicable in a source switch, wherein the SDN network comprises a sink switch, and multiple routing paths preconfigured between the source switch and the sink switch, the method comprising:
- transmitting monitoring packets on each of the multiple routing paths, wherein each of the monitoring packets comprises a monitoring tag and the monitoring tag comprises switch information, path information, and category information;
- receiving returned monitoring packets corresponding to the monitoring packets from the sink switch;
- identifying a routing path among the multiple routing paths through which the source switch received the returned monitoring packet;
- collecting and calculating a round-trip time (RTT) value for the identified routing path;
- determining whether RTT values of all the multiple routing paths have been collected; and if the RTT values of all the multiple routing paths have been collected, selecting one routing path which has a smallest RTT value for rerouting traffic.

2. The method of claim 1, wherein the returned monitoring packet comprises a monitoring tag, and the returned monitoring packet is identified using a flag value contained in the monitoring tag.

3. The method of claim 1 further comprising: receiving a normal packet; and forwarding the normal packet based on forwarding rules and a routing policy.

4. A method for rerouting traffic in a software defined networking (SDN) network applicable in a source switch, wherein the SDN network comprises a sink switch, and multiple routing paths preconfigured between the source switch and the sink switch, the method comprising:
- transmitting monitoring packets on each of the multiple routing paths;
- receiving returned monitoring packets corresponding to the monitoring packets from the sink switch;
- recording a time stamp TS1 before transmitting each of the monitoring packets;
- recording a time stamp TS2 when receiving each of the returned monitoring packets;
- identifying a routing path among the multiple routing paths through which the source switch received the returned monitoring packet;
- collecting and calculating a round-trip time (RTT) value for the identified routing path, wherein the RTT value is calculated by calculating a difference value between the time stamp TS2 and TS1;
- determining whether RTT values of all the multiple routing paths have been collected; and if the RTT values of all the multiple routing paths have been collected, selecting one routing path which has a smallest RTT value for rerouting traffic.

5. A method for rerouting traffic in a software defined networking (SDN) network applicable in a source switch, wherein the SDN network comprises a sink switch, and multiple routing paths preconfigured between the source switch and the sink switch, the method comprising:
- transmitting monitoring packets on each of the multiple routing paths;
- receiving returned monitoring packets corresponding to the monitoring packets from the sink switch;
- identifying a routing path among the multiple routing paths through which the source switch received the returned monitoring packet;
- collecting and calculating a round-trip time (RTT) value for the identified routing path;
- determining whether RTT values of all the multiple routing paths have been collected; and if the RTT values of all the multiple routing paths have been collected, selecting one routing path which has a smallest RTT value for rerouting traffic;
- updating a routing policy preconfigured by a SDN controller with the selected routing path; and
- determining whether to update the routing policy before updating, wherein the determining whether to update the routing policy comprises calculating a time difference value between two sequential normal packets entering the source switch, and updating the routing policy when the time difference value greater than or equal to a predetermined value.

6. A source switch in a software-defined networking (SDN) network, wherein the SDN network further comprises a sink switch, and multiple routing paths preconfigured between the source switch and the sink switch, the source switch comprising:
- a processor; and
- a memory for storing at least one computer program, wherein the computer program comprises instructions which are executed by the processor, and performs the following steps:
  - transmitting monitoring packets on each of the multiple routing paths, wherein each of the monitoring packets comprises a monitoring tag and the monitoring tag comprises switch information, path information, and category information;
  - receiving returned monitoring packets corresponding to the monitoring packets from the sink switch;
  - identifying a routing path among the multiple routing paths through which received the returned monitoring packet;
  - collecting and calculating a round-trip time (RTT) value for the identified routing path;
  - determining whether RTT values of all the multiple routing paths have been collected; and if the RTT values of all the multiple routing paths have been collected, selecting one routing path which has a smallest RTT value for rerouting traffic.

7. The source switch of claim 6, wherein the returned monitoring packet comprises a monitoring tag, and the returned monitoring packet is identified using a flag value contained in the monitoring tag.

8. The source switch of claim 6, wherein the process further performs the following step: receiving a normal packet; and forwarding the normal packet based on forwarding rules and a routing policy.

9. A source switch in a software-defined networking (SDN) network, wherein the SDN network further comprises a sink switch, and multiple routing paths preconfigured between the source switch and the sink switch, the source switch comprising:
- a processor; and
- a memory for storing at least one computer program, wherein the computer program comprises instructions which are executed by the processor, and performs the following steps:
  - transmitting monitoring packets on each of the multiple routing paths;
  - receiving returned monitoring packets corresponding to the monitoring packets from the sink switch;
  - recording a time stamp TS1 before transmitting each of the monitoring packets;
  - recording a time stamp TS2 when receiving each of the returned monitoring packets;

identifying a routing path among the multiple routing paths through which the source switch received the returned monitoring packet;

collecting and calculating a round-trip time (RTT) value for the identified routing path, wherein the RTT value is calculated by calculating a difference value between the time stamp TS2 and TS1;

determining whether RTT values of all the multiple routing paths have been collected; and if the RTT values of all the multiple routing paths have been collected, selecting one routing path which has a smallest RTT value for rerouting traffic.

10. A source switch in a software-defined networking (SDN) network, wherein the SDN network further comprises a sink switch, and multiple routing paths preconfigured between the source switch and the sink switch, the source switch comprising:

a processor; and a memory for storing at least one computer program, wherein the computer program comprises instructions which are executed by the processor, and performs the following steps:

transmitting monitoring packets on each of the multiple routing paths;

receiving returned monitoring packets corresponding to the monitoring packets from the sink switch;

identifying a routing path among the multiple routing paths through which the source switch received the returned monitoring packet;

collecting and calculating a round-trip time (RTT) value for the identified routing path;

determining whether RTT values of all the multiple routing paths have been collected; and if the RTT values of all the multiple routing paths have been collected, selecting one routing path which has a smallest RTT value for rerouting traffic;

updating a routing policy preconfigured by a SDN controller with the selected routing path; and determining whether to update the routing policy before updating, wherein the determining whether to update the routing policy comprises calculating a time difference value between two sequential normal packets entering the source switch, and updating the routing policy when the time difference value greater than or equal to a predetermined value.

* * * * *